United States Patent
Bertin (10) Patent No.: US 12,247,855 B2
(45) Date of Patent: Mar. 11, 2025

(54) INDUCTIVE ANGULAR POSITION SENSOR

(71) Applicant: SEMICONDUCTOR COMPONENTS INDUSTRIES, LLC, Scottsdale, AZ (US)

(72) Inventor: Jacques Jean Bertin, Pocatello, ID (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 173 days.

(21) Appl. No.: 18/194,215

(22) Filed: Mar. 31, 2023

(65) Prior Publication Data

US 2024/0328830 A1   Oct. 3, 2024

(51) Int. Cl.
*G01D 5/20* (2006.01)
*G01B 7/30* (2006.01)
*G01P 3/44* (2006.01)

(52) U.S. Cl.
CPC .............. *G01D 5/208* (2013.01); *G01B 7/30* (2013.01); *G01P 3/44* (2013.01)

(58) Field of Classification Search
CPC ..................................................... G01D 5/208
See application file for complete search history.

(56) References Cited

U.S. PATENT DOCUMENTS

| 11,614,344 | B1 | 3/2023 | Sachse |
| 2005/0041528 | A1* | 2/2005 | Knittel ............. G01S 7/527 367/99 |
| 2008/0084203 | A1 | 4/2008 | Meyer |
| 2009/0224751 | A1 | 9/2009 | Budde et al. |
| 2021/0239494 | A1 | 8/2021 | Elliott |
| 2022/0341758 | A1 | 10/2022 | Bertin |

OTHER PUBLICATIONS

Renesas, IPS2200 Inductive Position Sensor IC, Datasheet, Aug. 5, 2022, 37 pages.
Microsemi, LX3302, Rev. 1.0, Apr. 2015, 2 pages.
L. Lugani et al., "High speed inductive position sensor for E-machines," 2021, 7 pages.
Extended European Search Report for counterpart Application No. 24150409.1, mailed May 21, 2024, 6 pages.

* cited by examiner

*Primary Examiner* — Alesa Allgood
(74) *Attorney, Agent, or Firm* — Brake Hughes Bellermann LLP (57) ABSTRACT

An inductive sensor may track an angle of a movable element. In some cases, it is desirable to operate the inductive sensor using battery power so that turns are tracked properly even when power is lost. The disclosed inductive sensor includes circuitry to conserve power, such as a non-resonant driver that allows for fast measurements without wasting energy and a difference encoder that can estimate the angle within a range without the need for digitization and complicated processing.

25 Claims, 10 Drawing Sheets

INDUCTIVE ANGULAR POSITION SENSOR

FIELD OF THE DISCLOSURE

The present disclosure relates to inductive angular position sensors and more specifically to a transducer interface configured to track an angle and/or turn-count of an inductive angular position sensor.

BACKGROUND

Inductive angular position sensors can be used to measure an angular position of a rotating element by sensing a change in magnetic coupling (i.e., inductive coupling) between a rotor coil moving with the rotating element and a stationary coil. A signal corresponding to the change in inductive coupling may repeat as the rotating element is moved. Accordingly, an inductive sensor may be configured to take measurements of the rotating element at intervals to measure the movement. These measurements may include a turn-count based on the number of revolutions the rotating element has completed.

SUMMARY

The present disclosure describes a system, apparatus, and method for measuring an angle and detecting turns of a movable element using an approach that can be faster and consume less power than other approaches. The disclosed approach may provide a few technical advantages, such as increasing an operating life of an inductive sensor while it is operated on battery power.

In some aspects, the techniques described herein relate to an inductive sensor including: an exciter coil; a non-resonant driver coupled to the exciter coil, the non-resonant driver configured to switch the exciter coil alternately between a positive terminal and negative terminal of a voltage source to generate an excitation current in the exciter coil, the excitation current having a triangular-shaped amplitude; a plurality of receiver coils; a rotor coil mechanically coupled to a movable element, the rotor coil configured to couple a magnetic field generated by the excitation current to the plurality of receiver coils according to an angle-dependent inductive coupling between the rotor coil and the plurality of receiver coils, the magnetic field generating a plurality of coil voltages at the plurality of receiver coils; and a difference encoder configured to compare the plurality of coil voltages to determine an angle measurement of the movable element.

In some aspects, the techniques described herein relate to a method for measuring an angle, the method including: moving a rotor coil of a transducer to the angle; switching, using a non-resonant driver, an exciter coil of the transducer alternately between a positive terminal and a negative terminal of a voltage source during a measurement period to generate an excitation current having a non-sinusoidal amplitude; generating a plurality of coil voltages at a plurality of receiver coils based on an angle-dependent inductive coupling between the rotor coil an each of the plurality of receiver coils; and comparing, using a difference encoder, the plurality of coil voltages to measure the angle.

In some aspects, the techniques described herein relate to a system for measuring angular movement, including: a controller; a communication channel; and an inductive sensor configured to capture angle measurements in a low-power mode using a battery power while not powered by a power supply, the inductive sensor in the low-power mode configured to: switch an exciter coil alternately between a positive terminal and negative terminal of a voltage source to generate an excitation current in the exciter coil; receive a plurality of coil voltages corresponding to a position of a rotor coil at a plurality of receiver coils; and compare the plurality of coil voltages to determine a plurality of comparisons; and determine an angle state of a state machine based on the plurality of comparisons, the angle state corresponding to an angle measurement of a movable element mechanically coupled to the rotor coil.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

An inductive angular position sensor (i.e., inductive sensor) generates a measurement of an angle (i.e., $\theta$) based on a mutual inductance between a moving coil (i.e., rotor coil) and at least one stationary coil (i.e., receiver coil(s)). For example, two identical receiver coils may be mechanically arranged so that their signals form trigonometric functions (i.e., sine, cosine) of the angle of the rotor coil. In some implementations, three receiver coils can be mechanically arranged so that their signals are at phase angles (e.g., 120°) relative to each other. In this arrangement, the additional receiver coil may help (e.g., increase a resolution of) the calculation of the angle from the coil signals.

An inductive sensor may generate an incremental angle measurement (e.g., $\theta$ is +/−1 degree from last degree) or an absolute measurement angle measurement (e.g., $\theta$ is in a range from 0 to 360 degrees). One feature of an inductive sensor configured to measure the angle in absolute terms, is counting the number of turns (N). This may require the inductive sensor to continuously monitor its angle because there are instances in which movement may occur while the inductive sensor is not powered. For example, an inductive sensor monitoring a motor may continue to turn, due to the inertia of the motor, even after the power to the motor and sensor is turned OFF (e.g., due to a brown out). Accordingly, the inductive sensor may include a battery to provide power for measurements taken while the power supply is OFF. For example, an inductive sensor may operate in a low-power mode while being powered by a battery and in a high-power mode while being powered by a power supply. The present disclosure describes an inductive sensor configured to operate in a low-power mode.

While operating in the low-power mode, it may be desirable for the measurements to be power efficient in order to extend the life of the battery (i.e., operating life of the inductive sensor). Prior approaches have used resonant circuits to drive the coils in the sensor for an angle measurement. These resonant measurement approaches require the resonant circuit to fully charge (i.e., store energy) before the measurement is taken. After the measurement is taken, the charged resonant circuit is discharged (e.g., by a resistance of the resonant circuit), thereby dissipating (and wasting) the stored energy. This wasted energy can reduce the operating life of the inductive sensor.

The present disclosure describes a non-resonant measurement approach that can measure an angle faster and more power efficient than the resonant measurement approaches. The disclosed approach further conserves energy by computing the measurement based on the differences between coil voltages from each receiver coil, which can be computed using (low power) analog circuitry. Accordingly, the disclosed approach for an angle measurement may increase the time that the inductive sensor can operate in a low-power mode.

Figure 1:
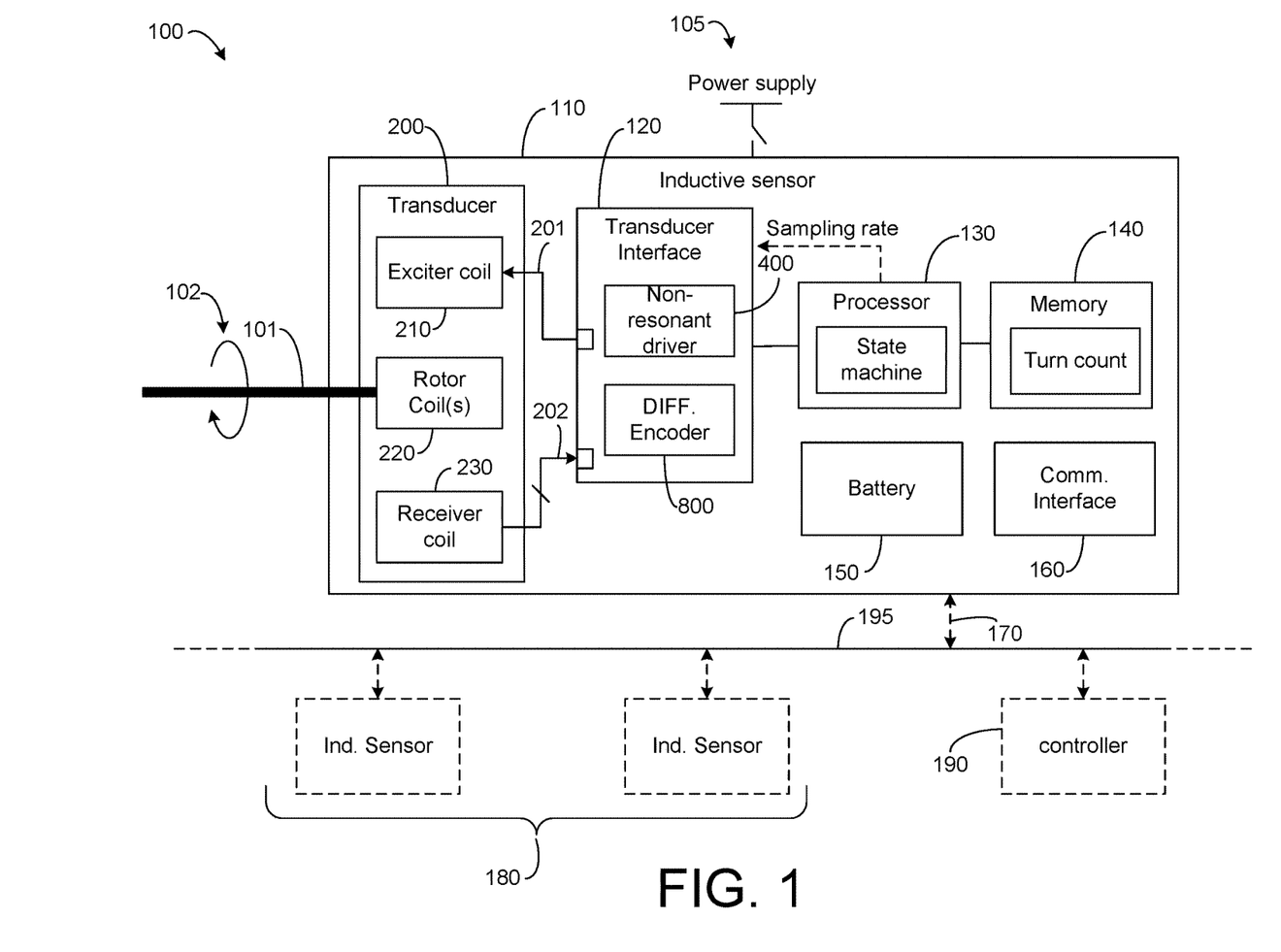
FIG. 1 illustrates an angle measurement system according to a possible implementation of the present disclosure.

FIG. 1 illustrates an angle measurement system according to a possible implementation of the present disclosure. The angle measurement system 100 includes a movable element 101 (e.g., motor shaft) that is configured to move (i.e., rotate) at least one rotor coil (i.e., rotor coil 220) in a transducer 200 of an inductive sensor 110. As will be shown, the transducer 200 may transform an excitation current 201 received from a transducer interface 120 into a plurality of coil signals (e.g., coil voltages 202), which are transmitted back to the transducer interface 120. The plurality of coil voltages 202 each have an amplitude that changes sinusoidally as the movable element 101 is rotated 102. Accordingly, a measurement of the angular position (i.e., angle measurement) of the movable element 101 may be determined based on the coil voltages 202.

The inductive sensor 110 may operate in a high-power mode when coupled to a power supply 105 or (as shown) in a low-power mode when decoupled from the power supply 105. In the high-power mode, the measurement of the angular position (i.e., angle measurement) may be more precise than in the low-power mode. One reason for angle measurements in a low-power mode is to track a turn-count (N) based on measurements of the angular position. For this reason, high-precision angle measurements may not be required. The rate at which the angle measurements are taken, however, should be sufficient to detect a turn without excessively wasting power. The present disclosure provides details of the operation and circuitry required for the inductive sensor 110 operating in the low-power mode to coarsely measure the angle of the movable element 101 and count turns.

As shown in FIG. 1, the power supply 105 is decoupled from the inductive sensor 110. In this condition, the inductive sensor can operate electrically in a low-power mode using energy from a battery 150. Accordingly, the inductive sensor 110 may include circuitry to detect the decoupling (not shown) and to switch from circuitry for a high-power mode of angle measurement (not shown) to circuitry for a low-power mode of angle measurement (as shown in FIG. 1).

The inductive sensor 110 further includes a processor 130 configured to receive signals from the transducer interface 120. The signals may be analog signals that are encoded according to an angle of the movable element 101. Accordingly, the processor 130 may include an analog-to-digital converter (ADC) to digitize the analog signals. The processor may be configured by software instructions recalled from a non-transitory computer readable medium (i.e., memory 140) to perform operations and/or processes associated with the angle measurement. For example, the operations and/or processes can include determining an angle, determining a turn-count, determining a direction of movement, and/or determining a speed of movement.

The angle measurement determined by the inductive sensor 110 may include a range of angles corresponding to the movable element 101, where the range is an angular resolution of the inductive sensor. The angle measurement may further include a turn-count based on a number of complete rotations (i.e., revolutions) that the movable element 101 has completed as it is rotated 102. The inductive sensor 110 may be configured to store the turn-count in a memory 140. In one possible implementation, after the power supply 105 is recoupled to the inductive sensor 110, the stored turn-count may be recalled and used to determine an angle measurement of the movable element 101.

The inductive sensor 110 may include a communication interface 160 configured to report (i.e., communicate) angle measurements of the inductive sensor 110 to other devices. The angle measurements may be stored in memory 140 and communicated over a communication link 170 (e.g., wired or wirelessly) to a communication channel 195 (e.g., bus). The communication channel 195 may communicatively couple the inductive sensor to a controller 190, which can be configured to use the angle measurements to monitor and control the movable element 101. The communication channel may further communicatively couple other inductive sensors 180 to the controller 190. For example, the controller 190 may control a robotic arm with multiple inductive sensors measuring a plurality of angles of a plurality of joints of the robotic arm. In this example, each inductive sensor may communicate its position to the controller 190, which can compute an overall position of the robotic arm. The controller 190 may then control the robotic arm based on this overall position.

In a possible implementation, the processor 130 of the inductive sensor 110 may be further configured to control aspects of the angle measurement process based on previous angle measurements. For example, the processor 130 may control a rate (i.e., sampling rate) at which the transducer interface 120 captures and encodes signals from the receiver coils. For this control, a (rotational) speed of the movable element 101 relative to a current sampling rate may be determined. For example, if the speed is determined to be too high to capture a turn at the sampling rate, then the sampling rate may be (automatically) increased for subsequent angle measurements. Likewise, if the speed is determined to be too low for the sampling rate so that power is being wasted, then the sampling rate may be (automatically) decreased for subsequent angle measurements.

Figure 2:
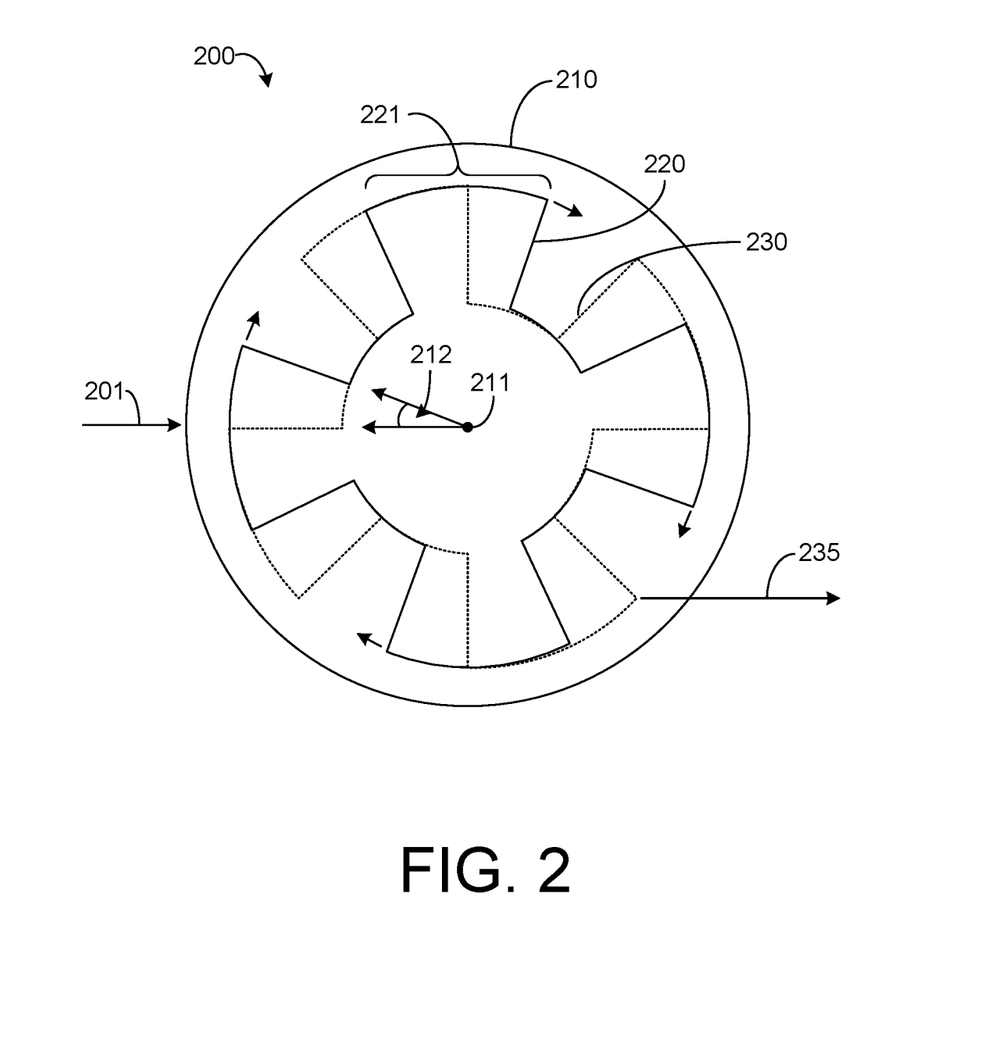
FIG. 2 is a top view of a transducer according to a possible implementation of the present disclosure.

FIG. 2 is a top view of a transducer according to a possible implementation of the present disclosure. To simplify the description of the basic operation, only one exciter coil, one rotor coil, and one receiver coil of the transducer 200 are shown.

An exciter coil 210 of the transducer 200 can be a planar loop that defines an interior centered at an axis 211 of the transducer 200. The exciter coil 210 is configured to receive an excitation current 201, which generates a magnetic field in the interior of the exciter coil 210 along a direction of the axis 211. The magnetic field exhibits a circular symmetry in the interior so a rotor coil 220 experiences the same magnetic field in any angle 212 (θ). The exciter coil 210 (and a receiver coil 230) can be located on a first plane, while the rotor coil 220 is located on a second plane. The first plane and the second plane are spaced apart (i.e., separated) by an air gap (z).

The rotor coil 220 of the transducer 200 is planar and is centered at the axis 211. The rotor coil may include a number of planar turns identified by their lobes. FIG. 2 illustrates a lobe 221 as a portion of the rotor coil extending to the maximum radius of the rotor coil. As shown in FIG. 2, the rotor coil 220 includes four lobes. The rotor coil 220 can be mechanically rotated (e.g., by the movable element 101) around the axis 211. The magnetic field generated by exciter coil 210 produces a current in the rotor coil 220, and this current may generate a magnetic field that is inductively coupled to the receiver coil 230. In other words, the rotor coil 220 may be configured to inductively couple the magnetic field generated by the excitation current 201 to the receiver coil.

The receiver coil 230 of the transducer can be a duplicate version of the rotor coil. In other words, the receiver coil may be planar, centered at the axis 211, and include the same number of planar turns (i.e., lobes) as the rotor coil 220. As mentioned, the receiver coil and the rotor coil may be separated, in a direction of the axis 211, by an air gap. As the rotor is rotated about the axis 211, the lobes of the rotor coil 220 and the lobes of the receiver coil 230 move in and out of alignment. The amount of alignment may correspond to an amount of inductive coupling between the coils. For example, when the lobes of the rotor coil 220 are completely aligned with the lobes of the receiver coil 230, then the inductive coupling may be at a maximum. When the lobes of the rotor coil are completely misaligned with the lobes of the receiver coil 230 then the inductive coupling may be at a minimum.

Figure 3:
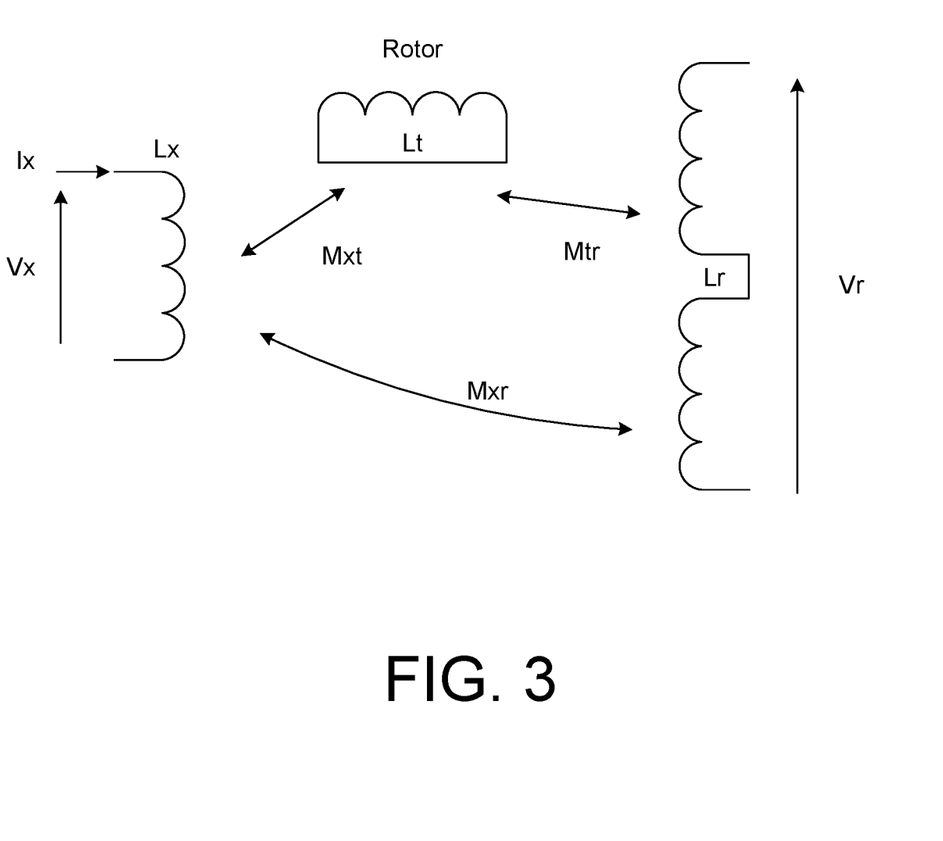
FIG. 3 schematically illustrates a circuit model of the transducer shown in FIG. 2.

FIG. 3 schematically illustrates a circuit model of the transducer shown in FIG. 2. The exciter coil 210 is represented as an exciter inductance (Lx), the rotor coil 220 is modeled as a rotor inductance (Lt), and the receiver coil is modeled as a receiver inductance (Lr). The exciter coil and the rotor coil are inductively coupled through an exciter-rotor mutual inductance (Mxt). The exciter coil and the receiver coil are inductively coupled through an exciter-receiver mutual inductance (Mxr), which is small and constant (with angle) so can be disregarded. The rotor coil and the receiver coil are inductively coupled through a rotor-receiver mutual inductance (Mtr). The coil voltage (Vr) may be related to the excitation current (Ix) by the following equation:

$$V_r \propto \left( \frac{M_{xt}(z) \cdot M_{tr}(z, \theta)}{L_t L_x} \right) I_x \quad (1)$$

In the equation above, the coil voltage (Vr) is a function of the air gap (z) and the angle (θ). In a first approximation, the rotor-receiver mutual inductance (Mtr) is a product of a first function of the air gap (F(z)) and a second function of the angle (M(θ)), where the second function is a pure sine or cosine. Accordingly, the coil voltage 235 (Vr) may be a sinusoidal function with the angle 212.

The sinusoidal coil voltage may progress through multiple cycles as the rotor coil completes one revolution. For the example shown in FIG. 2, the coil voltage 235 has four electrical cycles for every one mechanical revolution. Accordingly, it may not be possible to determine an angle from one coil voltage. As a result, a practical inductive sensor may include multiple receiver coils.

Receiver coils, in a transducer including multiple receiver coils, may be identically shaped (e.g., same number of lobes), symmetric around a common center (i.e., the axis 211), and planar on a common plane (i.e., the first plane described above). The receiver coils may be mechanically rotated with respect to each other. For example, when three receiver coils are implemented, then each receiver coil may be mechanically positioned plus/minus 120 degrees (in rotation) from the other two coils.

Returning to FIG. 1, the transducer interface 120 includes a non-resonant driver 400 configured to output an excitation current 201 to the exciter coil 210 of the transducer 200 during a measurement period (i.e., sampling period). As will be shown, the non-resonant driver 400 does not include a capacitor (C) coupled to the exciter inductance (Lx) of the exciter coil. Accordingly, there is no start-up time necessary to charge the capacitance before the measurement can be made. Additionally, because there is no energy stored in the capacitor there is little (e.g., no) energy wasted at the end of a measurement period (i.e., as the stored energy is discharged by a resistance). Additionally, because there is no resonance in the excitation current caused by the capacitor, a switching frequency of a switching signal (or signals) controlling the non-resonant driver is not constrained and can be selectable in a range to suit a user instead of being based on (e.g., equal to) a resonant frequency.

Figure 4:
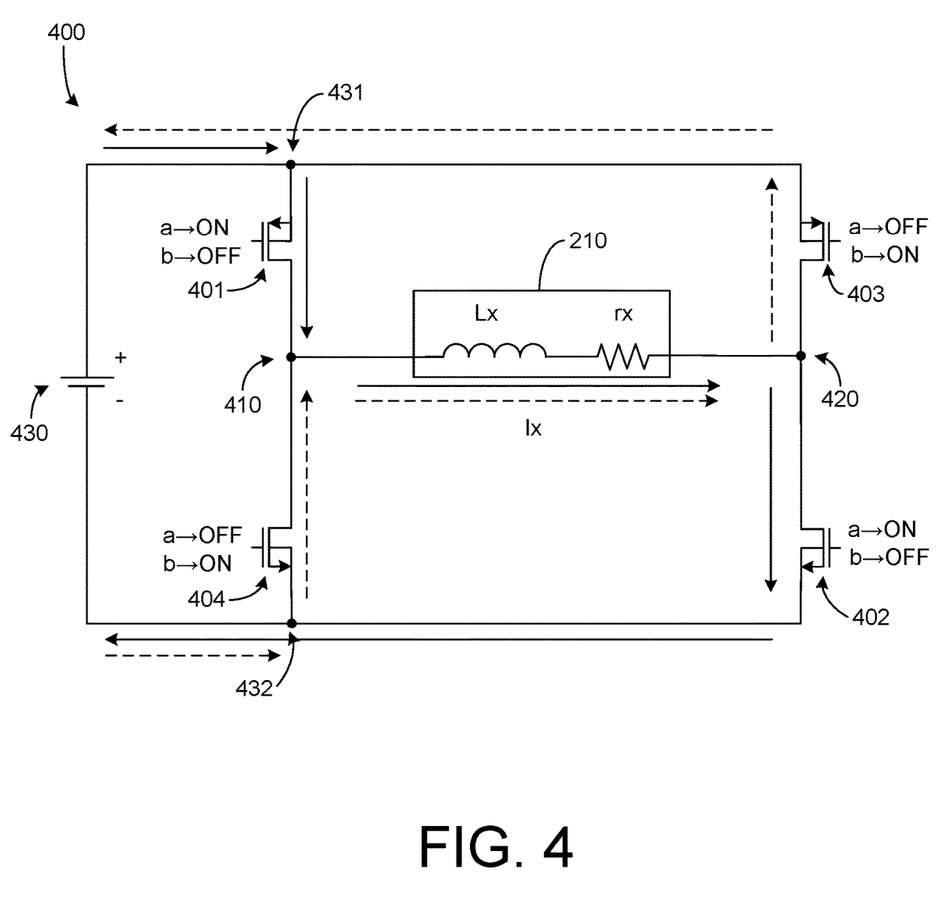
FIG. 4 is a schematic of a non-resonant driver according to a possible implementation of the present disclosure.

FIG. 4 is a schematic of a non-resonant driver according to a possible implementation of the present disclosure. The non-resonant driver 400 can be configured (e.g., by a switching signal) to switch the exciter coil 210 alternately between a positive terminal 431 and a negative terminal 432 of a voltage source 430 to generate an exciter current (Ix). As shown, the non-resonant driver 400 can be implemented as an H-bridge circuit. The H-bridge circuit includes a first switch 401 (e.g., PMOS transistor) coupled between the positive terminal 431 of the voltage source 430 and a first terminal 410 of the exciter coil 210. The H-bridge circuit further includes a second switch 402 (e.g., NMOS transistor) coupled between a second terminal 420 of the exciter coil 210 and a negative terminal 432 of the voltage source 430. The H-bridge circuit further includes a third switch 403 (e.g., PMOS transistor) coupled between the second terminal 420 of the exciter coil 210 and the positive terminal 431 of the voltage source 430. The H-bridge circuit further includes a fourth switch 404 (e.g., NMOS transistor) coupled between the negative terminal 432 of the voltage source 430 and the first terminal 410 of the exciter coil 210.

The H-bridge circuit is non-resonant, meaning that it does not include a capacitor coupled between the first terminal 410 and the negative terminal 432 and does not include a capacitor coupled between the second terminal 420 and the negative terminal 432. Because there are no capacitors, there is no energy wasted as it is dissipated by a small self-resistance (rx) of the exciter coil 210 after a measurement period.

The H-bridge circuit is operated alternately between a first switch configuration (a) and a second switch configuration (b). In the first switch configuration (a), the first switch 401 and the second switch 402 are ON (i.e., conducting), while the third switch 403 and the fourth switch 404 are OFF (i.e., not conducting). In the first switch configuration (a), the excitation current (Ix) flows along a first path (shown as a solid line). In the second switch configuration (b), the third switch 403 and the fourth switch 404 are ON, while the first switch 401 and the second switch 402 are OFF. IN the second switch configuration (b), the excitation current (Ix) flows along a second path (shown as a dotted line).

Figure 5:
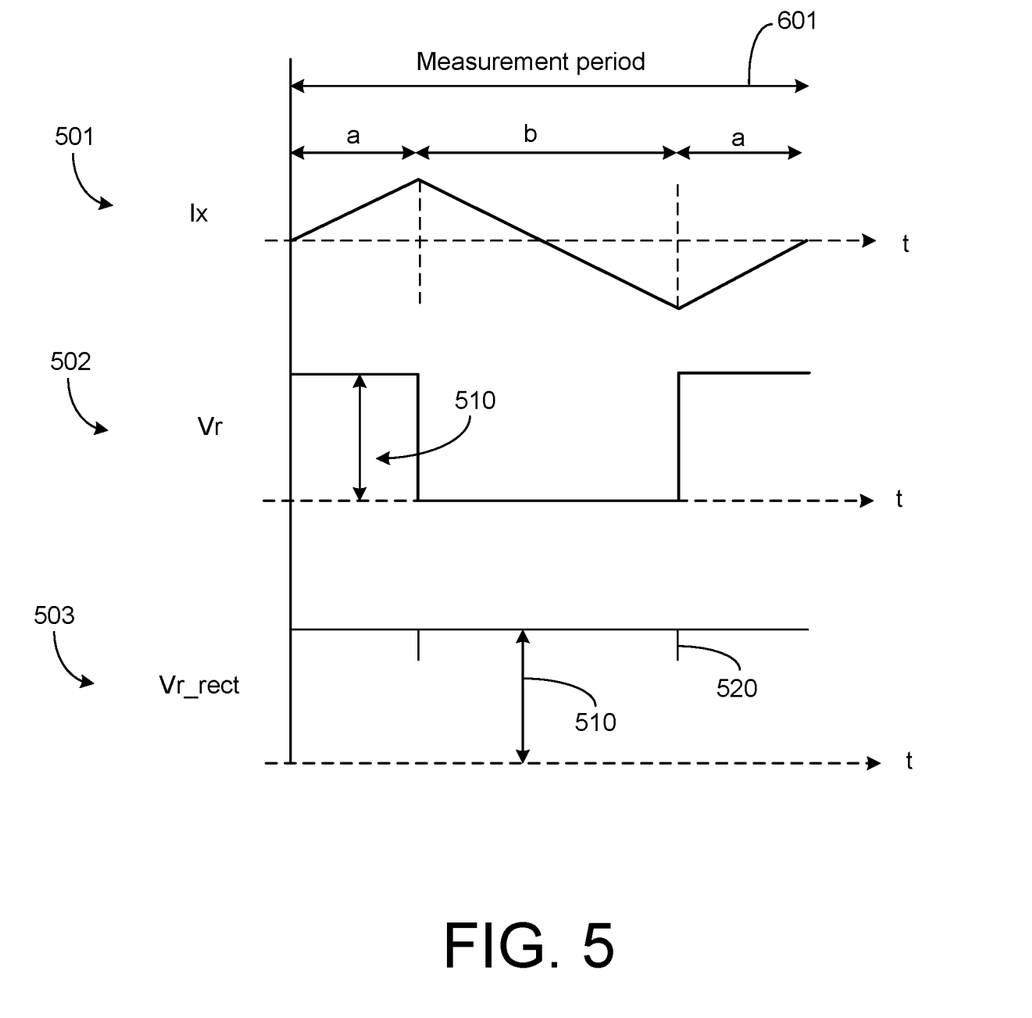
FIG. 5 includes graphs of signals at a transducer interface according to a possible implementation of the present disclosure.

FIG. 5 includes graphs of signals at a transducer interface according to a possible implementation of the present disclosure. The signals are plotted versus time and the graphs are correlated in time. The graphs illustrate a measurement period of an angle measurement. An angle measurement of the movable element is generated by the inductive sensor during each measurement period.

Figure 6:
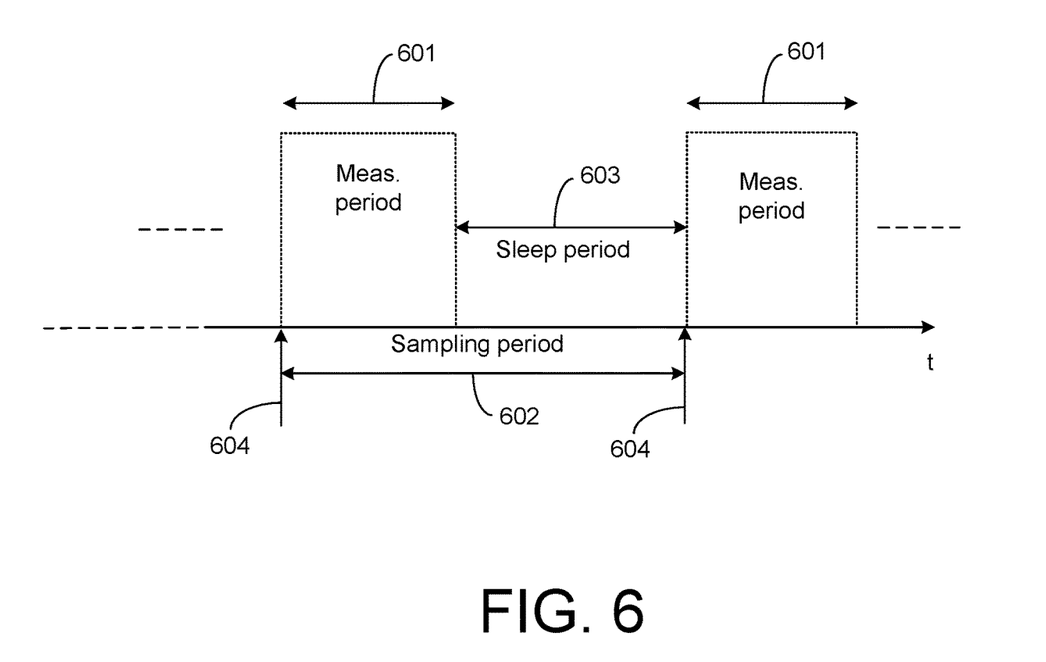
FIG. 6 illustrate aspects of an angle measurement over time according to a possible implementation of the present disclosure.

FIG. 6 illustrates aspects of an angle measurement over time according to a possible implementation of the present disclosure. As shown, the measurement period 601 can be repeated at intervals over time. For example, measurement periods may occur at a sampling rate (i.e., sampling frequency). In other words, each measurement period 601 may be spaced in time by a sampling period 602. During each measurement period 601 the transducer interface 120 (i.e., non-resonant driver, difference encoder) may be in an active condition. Between measurement periods 601 (i.e., during a sleep period 603), the transducer interface 120 may be in a sleep condition. In the sleep condition, the transducer interface 120 can consumes less power (e.g., no power) than it consumes when it is in the active condition (i.e., during a measurement period 601). In other words, the transducer interface 120 may electrically wake at a start 604 of each measurement period 601. Also, during each measurement period 601, switches in the non-resonant driver (i.e., in the active condition) can be switched between configurations at a switching frequency. As will be shown, the disclosed approach can allow a measurement period 601 to be reduced (e.g., minimized) in time so that the transducer interface 120 spends more time in the sleep condition. Also, as will be shown, the disclosed approach can allow for the sampling period to be adjusted to correspond to a speed at which the movable element 101 is rotating. Both of these techniques can allow for more power efficient operation of the inductive sensor 110.

Returning to FIG. 5, a first graph 501 shows an excitation current (Ix) plotted versus time during a possible measurement period. The first graph 501 further shows when the first switch configuration (a) and the second switch configuration (b) occur during the measurement period. As shown, in the first switch configuration (a) the excitation current increases and in the second switch configuration (b), the excitation current decreases. The excitation current is non-sinusoidal. The excitation current is piecewise linear between the first and second switch configuration. The excitation current is triangular shaped. For example, the excitation current is a triangle wave.

A second graph 502 shows a coil voltage (Vr) at a receiver coil that results from the excitation current (Ix) in the first graph 501. The coil voltage is a derivative of the excitation current as shown in the equation below.

$$V_r \propto \frac{dI_x}{dt} \quad (2)$$

Accordingly, the receiver coil voltage (i.e., coil voltage) may be a square wave having an amplitude 510 corresponding to an angle-dependent inductive coupling between the rotor coil and the receiver coil. The amplitude 510 corresponds to the angle of the movable element. In a three-receiver coil transducer 200, the amplitudes of each receiver coil for a particular angle of the movable element may be different because the inductive coupling between the rotor coil and each receiver coil can be different. The amplitude 510 is arrived at immediately after the start of the measurement period 601. In other words, the coil voltage (Vr) is ready for measurement immediately after the non-resonant driver is activated from the sleep condition.

The measurement of Vr (i.e., the amplitude 510) may include rectifying the coil voltage so the alternating amplitude becomes (ideally) a direct current (DC) voltage at the amplitude 510. A third graph 503 shows a rectified receiver coil voltage (Vr_rect), which is the rectified version of the receiver coil voltage (Vr) shown in the second graph 502.

After rectification, high-frequency noise 520 (i.e., spike, glitch, transient, etc.) may exist on the rectified receiver coil voltage (i.e., rectified voltage). Accordingly, the measurement of the coil voltage (Vr) may further include filtering (e.g., low-pass filtering) the rectified voltage (Vr_rect) to reduce (e.g., eliminate) the high-frequency noise. The rectification and the filtering may be carried out by the difference encoder 800 of the transducer interface 120.

As mentioned, the transducer 200 may include three receiver coils: a first receiver coil (i.e., first coil (C1)), a second receiver coil (i.e., second coil (C2)), and a third receiver coil (i.e., third coil (C3)). The three receiver coils (C1, C2, C3) may be coplanar and identically shaped. The coils may be arranged at mechanical angles with each other so that (i) the angle-dependent inductive coupling between the rotor coil 220 and the first receiver coil (C1) is −120 degrees out of phase (i.e., phase shifted) with the angle-dependent inductive coupling between the rotor coil 220 and the second receiver coil (C2) and (ii) the angle-dependent inductive coupling between the rotor coil 220 and the first receiver coil (C1) is +120 degrees out of phase (i.e., phase shifted) with the angle-dependent inductive coupling between the rotor coil and the third receiver coil (C3). As a result, the coil voltage from each of these coils may be different for each angle of the movable element.

A transducer 200 of an inductive sensor 110 can have two types of rotations: electrical and mechanical. An electrical rotation corresponds to the changing coil voltage as it moves through a complete cycle of phase angles (i.e., 0 to 360 degrees-electrical). A mechanical rotation corresponds to the changing position of the movable element 101 as it moves through a complete rotation of mechanical angles (i.e., 0 to 360 degrees-mechanical). The number of lobes on the rotor coil and the number of lobes on a receiver coil defines the ratio of the electrical rotation to mechanical rotation.

Figure 7:
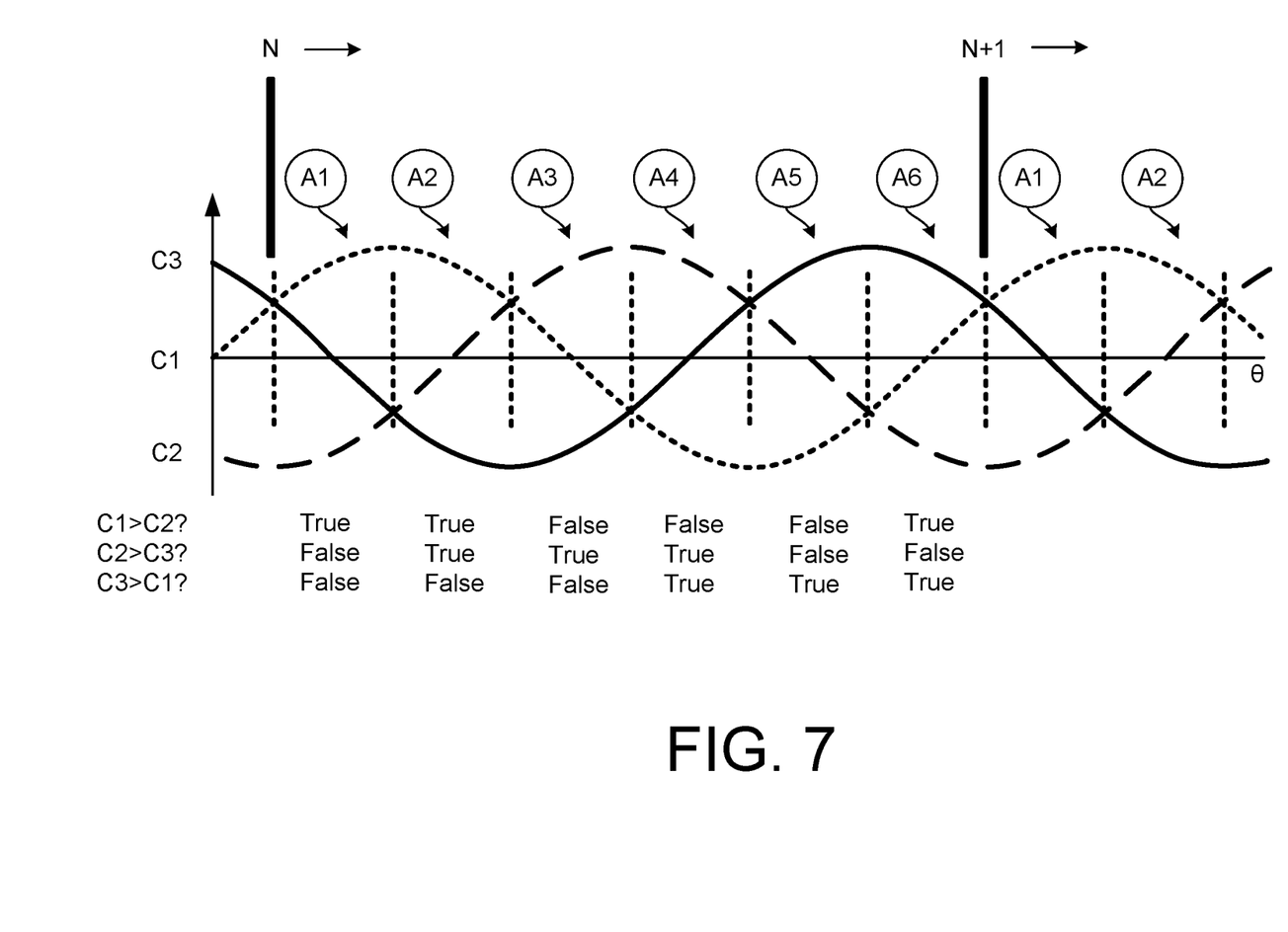
FIG. 7 illustrates receiver coil voltages for a range of angles according to a possible implementation of the present disclosure.

FIG. 7 illustrates receiver coil voltages for a range of angles according to a possible implementation of the present disclosure. As shown, coil voltages for three receiver coils (C1, C2, C3), arranged as described above, are shown for various rotor coil angles (θ). As can be observed, the voltages measured at the coils trace sinusoidal waveforms, which are relatively phase shifted from one another, as the rotor coil rotates. This feature allows for various angle states to be defined based on the differences between the coil voltages. For example, in a first angle state (A1) the first coil (C1) voltage is always the highest coil voltage, the second coil (C2) voltage is always the lowest coil voltage, and the third coil (C3) voltage is always between the first coil (C1) and the second coil (C2). Accordingly, 6 distinct angle states (A1, A2, A3, A4, A5, A6) may be defined for one complete rotation (i.e., θ=360 degrees) of the rotor coil. As a result, encoding the relative differences between the coil voltages can determine an angle measurement. A resolution of the angle measurement is the range of angles for each angle state (e.g., 60 degrees). The encoding may be carried out by the difference encoder 800 of the transducer interface 120.

Figure 8:
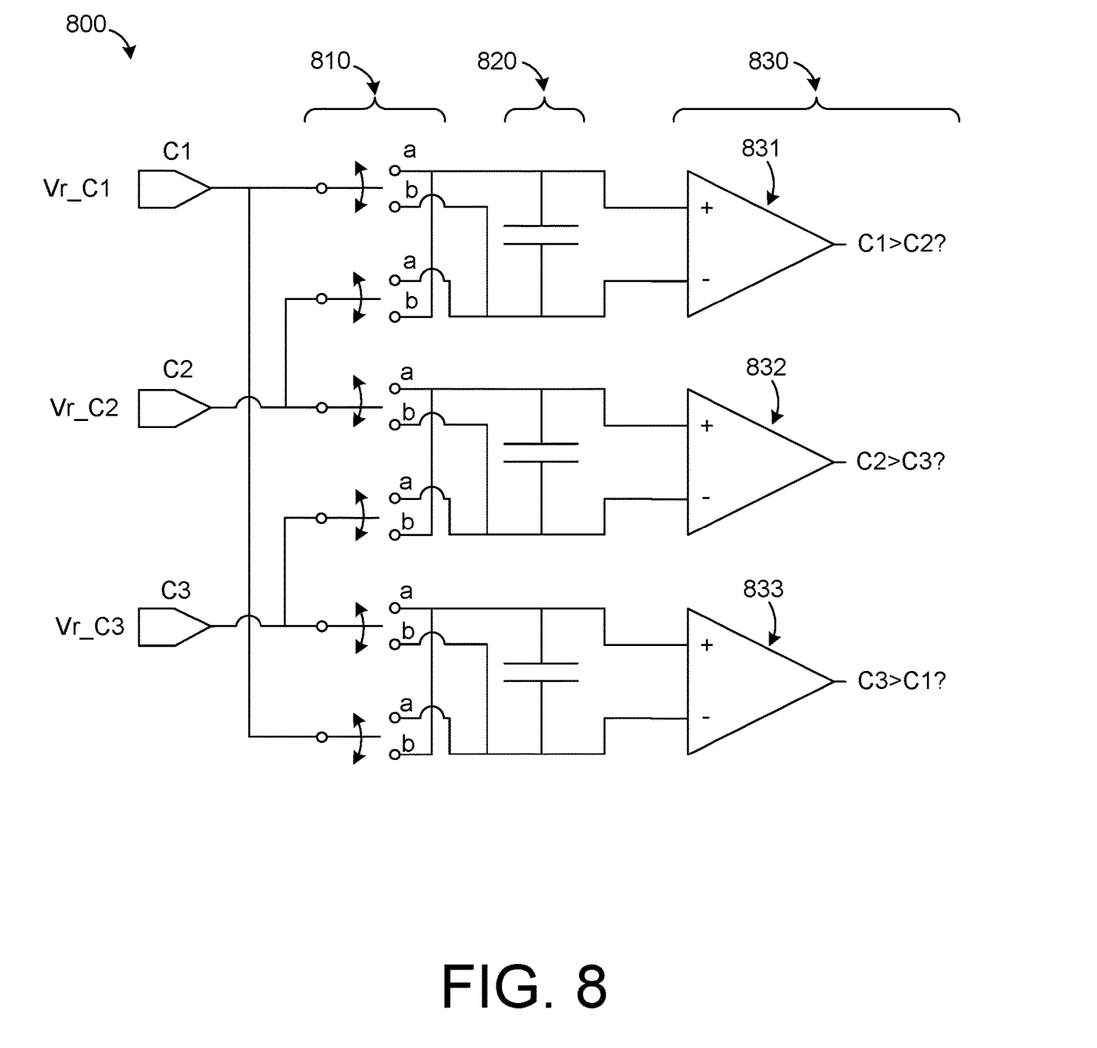
FIG. 8 is a schematic of a difference encoder according to a possible implementation of the present disclosure.

FIG. 8 is a schematic of a difference encoder according to a possible implementation of the present disclosure. The difference encoder 800 includes three inputs, each coupled to a respective receiver coil (C1, C2, C3) of the transducer 200. A first input receives a first coil voltage (Vr_C1) from the first receiver coil (C1); a second input receives a second coil voltage (Vr_C2) from the second receiver coil (C2); and a third input receives a third coil voltage (Vr_C3) from the third receiver coil (C3).

The difference encoder 800 further includes a first comparator 831 configured to compare the first coil voltage (Vr_C1) to the second coil voltage (Vr_C2); a second comparator 832 configured to compare the second coil voltage (Vr_C2) to the third coil voltage (Vr_C3); and a third comparator 833 configured to compare the third coil voltage (Vr_C3) to the first coil voltage (Vr_C1). The first comparator 831 may be configured to generate a first comparison of the first coil voltage and the second coil voltage; the second comparator 832 may be configured to generate a second comparison of the second coil voltage and the third coil voltage; and the third comparator 833 may be configured to generate a third comparison of the third coil voltage to the first coil voltage.

As shown in FIG. 7, the output of the first comparator 831 may be a digital signal corresponding to a TRUE/FALSE answer to the question: is the voltage of C1 greater than the voltage of C2 (C1>C2?). The output of the second comparator 832 may be a digital signal corresponding to a TRUE/FALSE answer to the question: is the voltage of C2 greater than the voltage of C3 (C2>C3?). The output of the third comparator 833 may be a digital signal corresponding to a TRUE/FALSE answer to the question: is the voltage of C3 greater than the voltage of C1 (C3>C1?). The outputs of the comparators 830 may collectively correspond to one of the angle states (A1, A2, A3, A4, A5, A6), shown in FIG. 7. Fault states may occur when all outputs of the comparators match because the condition (TRUE, TRUE, TRUE) and the condition (FALSE, FALSE, FALSE) cannot exist.

As shown in FIG. 8, the difference encoder 800 can further include a rectification stage 810. The rectification stage 810 includes a set of switches for each comparator that follow the switch conditions (a, b) of the non-resonant driver 400. The set of switches for each comparator control the polarity of the inputs to each comparator so that they alternate as the coil voltages alternate (see FIG. 5), thereby effectively rectifying the receiver coil voltage.

The difference encoder 800 can further include a filtering stage 820. As shown in FIG. 8, the filtering stage may include a capacitor configured to reduce high-frequency noise 520 from affecting the comparisons made by the comparators 830. The filtering stage may improve an accuracy of the encoding.

The outputs of the difference encoder 800 may be processed to determine an angle measurement. The processing may be implemented in circuitry, hardware, firmware (i.e., hard-coded), software, or some combination thereof. For example, the outputs of the difference encoder 800 may be coupled to a processor 130 configured (by software instructions) as a state machine. As described, the outputs of the comparators 830 may define a state (A1, A2, A3, A4, A5, A6) in the state machine. In other words, the state machine may be configured to determine an angle state (i.e., state) based on the first comparison, the second comparison and the third comparison of the difference encoder 800, and the angle state may correspond to the angle measurement of the movable element. For example, TABLE 1 illustrates angle measurements for various states according to an implementation of the present disclosure.

TABLE 1

Possible angle measurements for different states.

| STATE | ANGLE MEAS. |
| --- | --- |
| A1 | 0 ≤ θ < 60 |
| A2 | 60 ≤ θ < 120 |
| A3 | 120 ≤ θ < 180 |
| A4 | 180 ≤ θ < 240 |
| A5 | 240 ≤ θ < 300 |
| A6 | 300 ≤ θ < 360 |

The processor 130 may be further configured by software instructions to detect transitions between the states (i.e., angle-state transitions) over a plurality of measurement periods (i.e., over time) as the movable element rotates. The angle-state transitions may be tracked to adjust (e.g., add to, subtract from) a turn-count (N). Further, the angle-state transitions may be tracked to estimate a speed of the movable element relative to a sampling rate.

Figure 9A:
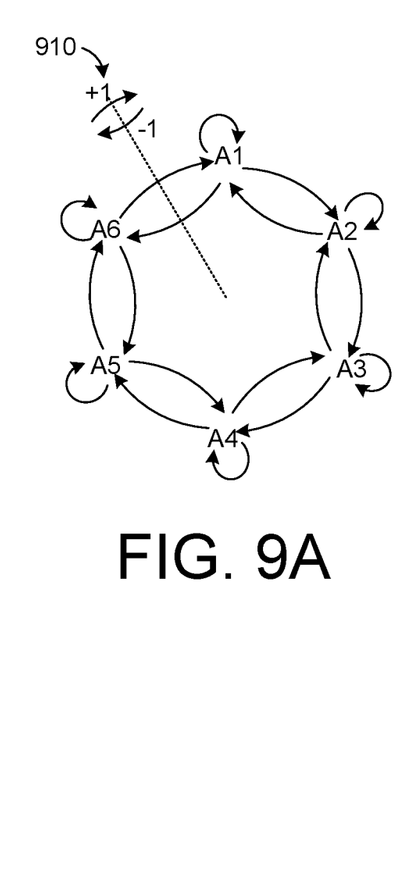
FIGS. 9A-9C illustrates angle-state transitions of a state machine for different speeds of the movable element according to a possible implementation of the present disclosure.
Figure 9B:
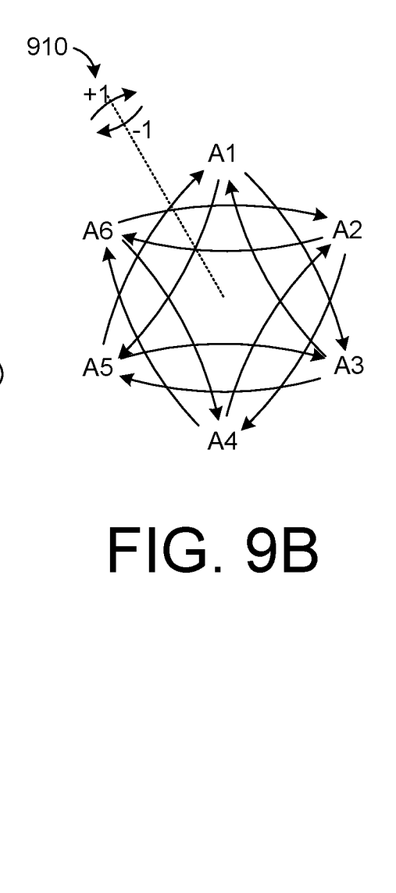
Figure 9C:
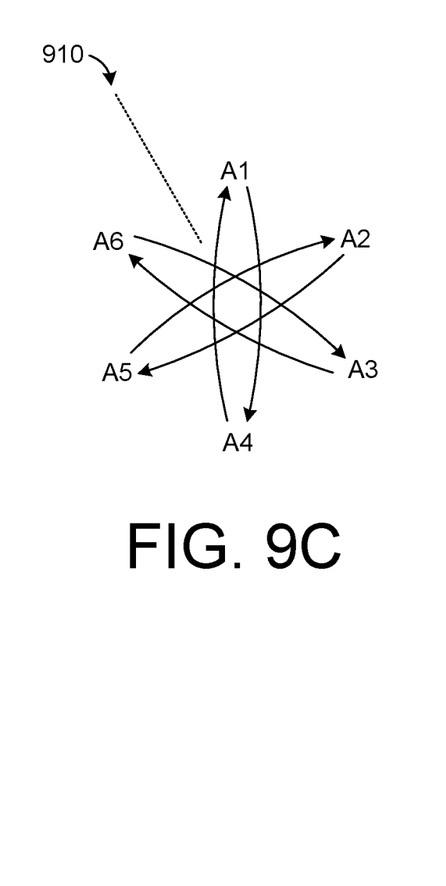

FIGS. 9A-9C illustrate angle-state transitions of a state machine at different speeds. In each figure, possible angle-state transitions are shown as arrows. FIG. 9A illustrates the angle-state transitions for a speed that is low compared to the sampling rate. As shown, the sampling rate is high enough compared to the speed that transitions between angle states are sequential (in either direction) and may remain at one state for multiple measurement periods.

As shown in FIGS. 9A-9C, the transition between A1 and A6 is designated as the turn-count transition. When an angle-state transitions from A6 to A1, a turn-count may be adjusted by a positive increment (e.g., +1) and when an angle-state transitions from A1 to A6, the turn-count may be adjusted by a negative increment (e.g., −1).

FIG. 9B illustrates the angle-state transitions for a speed that is high compared to the sampling rate but not too high to count turns. As shown, the relative sampling rate of the angle state is too low to capture sequential movement between angle states. As a result, angle-state transitions may skip a state. For example, A1 may transition to A3, and A3 may transition to A5 (and vice versa). The number of states skipped may be used to compute an estimate of a speed of the movable element, and the direction of the movement between states may be used to compute a direction of the rotation of the movable element. A turn-count may still be adjusted because a turn-count transition 910 (i.e., A1-to-A6, A6-to-A1) may still be detected (i.e., crossed). Accordingly, when the angle state transitions from A5 to A1 or A6 to A2, the turn-count may be adjusted by a positive increment (e.g., +1) and when an angle-state transitions from A1 to A5 or A2 to A6, the turn-count may be adjusted by a negative increment (e.g., −1).

FIG. 9C illustrates the angle-state transitions for a speed that high compared to the sampling rate and is too high to count turns. As shown, the relative sampling rate of the angle state is too low to capture sequential movement between angle states. As a result, angle-state transitions may skip multiple states. For example, A1 may transition to A4, and A4 may transition to A1. A turn-count is not adjusted because the turn-count transition (i.e., A1-to-A6, A6-to-A1) is not crossed by an angle-state transition.

Figure 10:
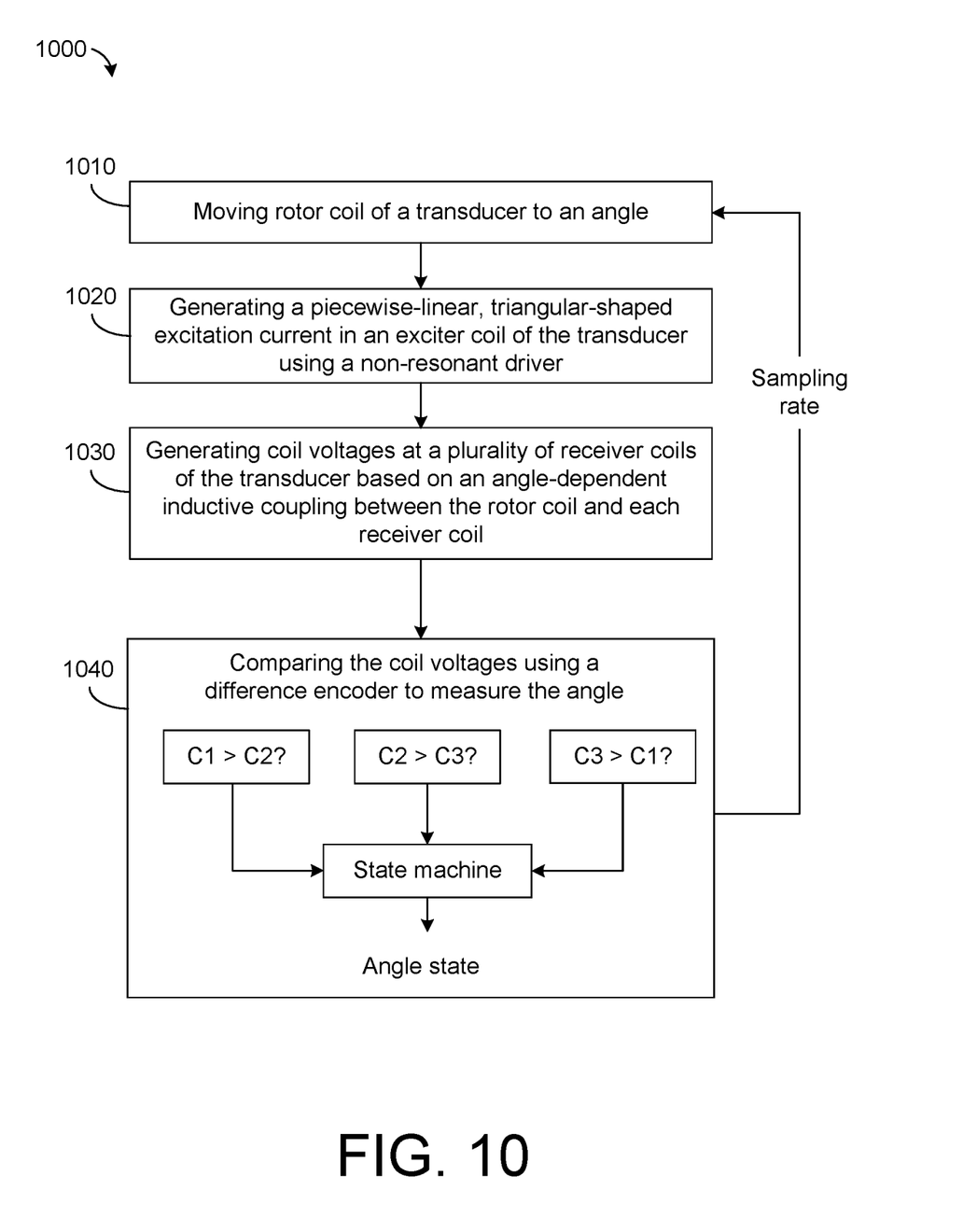
FIG. 10 is a flowchart of a method for taking an angle measurement of a movable element according to a possible implementation of the present disclosure.

FIG. 10 is a flowchart of a method for measuring an angle. The method 1000 includes moving 1010 a rotor coil of a transducer to an angle. In a possible implementation the rotor coil is coupled to a movable element so that the angle of the rotor coil corresponds (e.g., is equal) to an angle of the movable element. The method 1000 further includes generating 1020 a non-sinusoidal (e.g., triangle wave) excitation current in an exciter coil of the transducer using a non-resonant driver. The non-resonant driver does not require the storage of any energy (e.g., no capacitor) so that little (e.g., no) charge time is required before a measurement can be made and so that little (e.g., no) discharge of energy is wasted after the measurement is made. The method 1000 further includes generating 1030 coil voltages at a plurality of receiver coils of the transducer based on an angle-dependent inductive coupling between the rotor coil and each receiver coil. The method 1000 further includes comparing 1040 the coil voltages using a difference encoder to measure the angle.

In a possible implementation the coil voltages may be compared to generate a plurality of comparisons (i.e., comparisons). The comparisons can then be applied to a state machine to determine an angle state corresponding to the comparisons. The angle state may represent a range of angles that angle is within (i.e., the angle state may be the angle measurement). The process described above can be repeated at a sampling rate. Further, the movement between angle states may be analyzed over time to determine a direction movement, a speed of movement, and/or a turn count. In a possible implementation, the sampling rate of the angle measurement may be adjusted based on the speed of movement. This adjustment may increase a range of possible rotational speeds of the rotor coil for which turns can be detected (as compared to no adjustment).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

The invention claimed is:

1. An inductive sensor comprising:
an exciter coil;
a non-resonant driver coupled to the exciter coil, the non-resonant driver configured to switch the exciter coil alternately between a positive terminal and a negative terminal of a voltage source to generate an excitation current in the exciter coil, the excitation current having a triangular-shaped amplitude;
a plurality of receiver coils;
a rotor coil mechanically coupled to a movable element, the rotor coil configured to couple a magnetic field generated by the excitation current to the plurality of receiver coils according to an angle-dependent inductive coupling between the rotor coil and the plurality of receiver coils, the magnetic field generating a plurality of coil voltages at the plurality of receiver coils; and
a difference encoder configured to compare the plurality of coil voltages to determine an angle measurement of the movable element.

2. The inductive sensor according to claim 1, wherein:
the non-resonant driver is configured to switch the exciter coil alternately between the positive terminal and the negative terminal of the voltage source during a measurement period; and
the difference encoder is configured to compare the plurality of coil voltages to determine the angle measurement of the movable element at any time during the measurement period.

3. The inductive sensor according to claim 1, wherein the non-resonant driver is activated from a sleep condition to switch the exciter coil alternately between the positive terminal and the negative terminal at a start of a measurement period, the plurality of coil voltages being ready for measurement immediately after the non-resonant driver is activated.

4. The inductive sensor according to claim 1, wherein the non-resonant driver is configured to switch the exciter coil alternately between the positive terminal and the negative terminal of the voltage source at a switching frequency that is not based on a resonant frequency of the excitation current.

5. The inductive sensor according to claim 1, wherein substantially all of the excitation current in the exciter coil is returned to the voltage source after the angle measurement of the movable element is determined.

6. The inductive sensor according to claim 1, wherein the non-resonant driver is an H-bridge circuit that includes:
   a first switch coupled between the positive terminal of the voltage source and a first terminal of the exciter coil;
   a second switch coupled between the negative terminal of the voltage source and a second terminal of the exciter coil, the first switch and the second switch configured in an ON state by a switching signal to increase the excitation current in the exciter coil;
   a third switch coupled between the positive terminal of the voltage source and the second terminal of the exciter coil; and
   a fourth switch coupled between the negative terminal of the voltage source and the first terminal of the exciter coil, the third switch and the fourth switch configured in the ON state by the switching signal to decrease the excitation current in the exciter coil.

7. The inductive sensor according to claim 6, wherein the H-bridge circuit does not include a capacitor coupled to the first terminal or the second terminal of the exciter coil.

8. The inductive sensor according to claim 1, wherein the plurality of receiver coils include:
   a first receiver coil, the magnetic field coupled to the first receiver coil generating a first coil voltage at the first receiver coil;
   a second receiver coil, the magnetic field coupled to the second receiver coil generating a second coil voltage at the second receiver coil; and
   a third receiver coil, the magnetic field coupled to the third receiver coil generating a third coil voltage at the third receiver coil.

9. The inductive sensor according to claim 8, wherein:
   the first receiver coil, the second receiver coil and the third receiver coil are identically shaped, symmetric around a common center, and planar on a common plane; and
   the first receiver coil, the second receiver coil and the third receiver coil are rotated at angles with respect to each other around the common center.

10. The inductive sensor according to claim 9, wherein:
    the angle-dependent inductive coupling between the rotor coil and the first receiver coil is −120 degrees out of phase with the angle-dependent inductive coupling between the rotor coil and the second receiver coil; and
    the angle-dependent inductive coupling between the rotor coil and the first receiver coil is +120 degrees out of phase with the angle-dependent inductive coupling between the rotor coil and the third receiver coil.

11. The inductive sensor according to claim 8, wherein the difference encoder includes:
    a first comparator configured to generate a first comparison of the first coil voltage and the second coil voltage;
    a second comparator configured to generate a second comparison of the second coil voltage and the third coil voltage; and
    a third comparator configured to generate a third comparison of the third coil voltage to the first coil voltage.

12. The inductive sensor according to claim 11, wherein the inductive sensor further includes a state machine configured to determine an angle state based on the first comparison, the second comparison, and the third comparison, the angle state corresponding to the angle measurement of the movable element.

13. The inductive sensor according to claim 12, wherein the inductive sensor further includes a processor configured by software instructions to detect angle-state transitions of the state machine over time to adjust a turn-count.

14. The inductive sensor according to claim 12, wherein the inductive sensor further includes a processor configured by software instructions to detect angle-state transitions of the state machine over time to estimate a speed of the movable element relative to a sampling rate of the angle measurement.

15. The inductive sensor according to claim 14, wherein the processor is further configured by the software instructions to adjust the sampling rate of the angle measurement based on the speed of the movable element.

16. A method for measuring an angle, the method comprising:
    moving a rotor coil of a transducer to the angle;
    switching, using a non-resonant driver, an exciter coil of the transducer alternately between a positive terminal and a negative terminal of a voltage source during a measurement period to generate an excitation current having a non-sinusoidal amplitude;
    generating a plurality of coil voltages at a plurality of receiver coils based on an angle-dependent inductive coupling between the rotor coil an each of the plurality of receiver coils; and
    comparing, using a difference encoder, the plurality of coil voltages to measure the angle.

17. The method according to claim 16, wherein the plurality of receiver coils includes a first receiver coil, a second receiver coil and a third receiver coil, and wherein comparing, using the difference encoder, the plurality of coil voltages to measure the angle includes:
    generating, using a first comparator, a first comparison of a first coil voltage at the first receiver coil and a second coil voltage at the second receiver coil;
    generating, using a second comparator, a second comparison of the second coil voltage at the second receiver coil and a third coil voltage at the third receiver coil; and
    generating, using a third comparator, a third comparison of the third coil voltage at the third receiver coil and the first coil voltage at the first receiver coil.

18. The method according to claim 17, further comprising:
    determining an angle state of a state machine based on the first comparison, the second comparison, and the third comparison, the angle state corresponding to the angle.

19. The method according to claim 18, further comprising:
    taking repeated measurements of the angle at a sampling rate;
    detecting angle-state transitions of the state machine based on the repeated measurements;
    estimating a speed of the rotor coil relative to the sampling rate based on the angle-state transitions; and
    adjusting the sampling rate based on the speed of the rotor coil.

20. The method according to claim 18, further comprising:
    taking repeated measurements of the angle at a sampling rate;
    detecting angle-state transitions of the state machine based on the repeated measurements; and
    adjusting a turn-count based on the angle-state transitions.

21. The method according to claim 16, wherein the non-sinusoidal amplitude is triangular shaped and piecewise linear.

22. A system for measuring angular movement, comprising:
- a controller;
- a communication channel; and
- an inductive sensor configured to capture angle measurements in a low-power mode using a battery power while not powered by a power supply, the inductive sensor in the low-power mode configured to:
    - switch an exciter coil alternately between a positive terminal and negative terminal of a voltage source to generate an excitation current in the exciter coil;
    - receive a plurality of coil voltages corresponding to a position of a rotor coil at a plurality of receiver coils; and
    - compare the plurality of coil voltages to determine a plurality of comparisons; and
    - determine an angle state of a state machine based on the plurality of comparisons, the angle state corresponding to an angle measurement of a movable element mechanically coupled to the rotor coil.

23. The system for measuring angular movement according to claim 22, wherein the inductive sensor in the low-power mode is further configured to:
- detect angle-state transitions of the state machine over time;
- estimate a speed of the movable element relative to a sampling rate of the angle measurement based on the angle-state transitions over time; and
- adjust a sampling rate of the angle measurement based on the speed of the movable element.

24. The system for measuring angular movement according to claim 22, wherein the inductive sensor in the low-power mode is further configured to:
- detect angle state transitions of the state machine over time; and
- adjust a turn-count based on the angle state transitions.

25. The system for measuring angular movement according to claim 22, wherein the excitation current has a non-sinusoidal amplitude.

* * * * *